United States Patent [19]

Douglas

[11] Patent Number: 4,643,473
[45] Date of Patent: Feb. 17, 1987

[54] ROBOTIC MECHANICAL HAND
[75] Inventor: Barry D. Douglas, Mountainview, Calif.
[73] Assignee: General Motors Corporation, Detroit, Mich.
[21] Appl. No.: 825,378
[22] Filed: Feb. 3, 1986
[51] Int. Cl.⁴ .............. A61F 1/06; B66C 3/16
[52] U.S. Cl. ................. 294/111; 294/86.4; 623/64
[58] Field of Search .......... 294/111, 88, 86.4, 99.1, 294/64.1, 66.1, 100, 106, 112, 113, 119.2, 120; 623/25, 63, 64; 901/31, 36, 37, 39

[56] References Cited
U.S. PATENT DOCUMENTS

| 2,549,074 | 4/1951 | Fishbein et al. | 623/64 |
| 3,927,424 | 12/1975 | Itoh | 623/63 |
| 4,246,661 | 1/1981 | Pinson | 623/25 |
| 4,350,381 | 9/1982 | Hellman | 294/88 |
| 4,367,891 | 1/1983 | Wauer et al. | 294/88 |

OTHER PUBLICATIONS
NASA Tech. Brief, vol. 8, No. 1, item #144 from JPL Invention Report 5413/NPO-15959, by Ruoff & Salisbury.
Dept. of Physical Engineering, Tokyo Institute of Technology, 2-12-1, Ohokayama, Meguro-Ku; Tokyo, Japan, "The Development of Soft Gripper for the Versatile Robot Hand".

Primary Examiner—James B. Marbert
Attorney, Agent, or Firm—Patrick M. Griffin

[57] ABSTRACT

A dual mode robotic mechanical hand is disclosed in a preferred embodiment with one fixed and two opposed articulated fingers, each with a base and a tip digit. In a first mode, the two independently controlled articulated fingers are operated to soft grip an object against the fixed finger. In a second mode, the base digits are anchored so that only the tip digits rotate, allowing smaller size objects to be conveniently manipulated. The preferred embodiment is designed for particular compactness and simplicity, as well.

3 Claims, 12 Drawing Figures

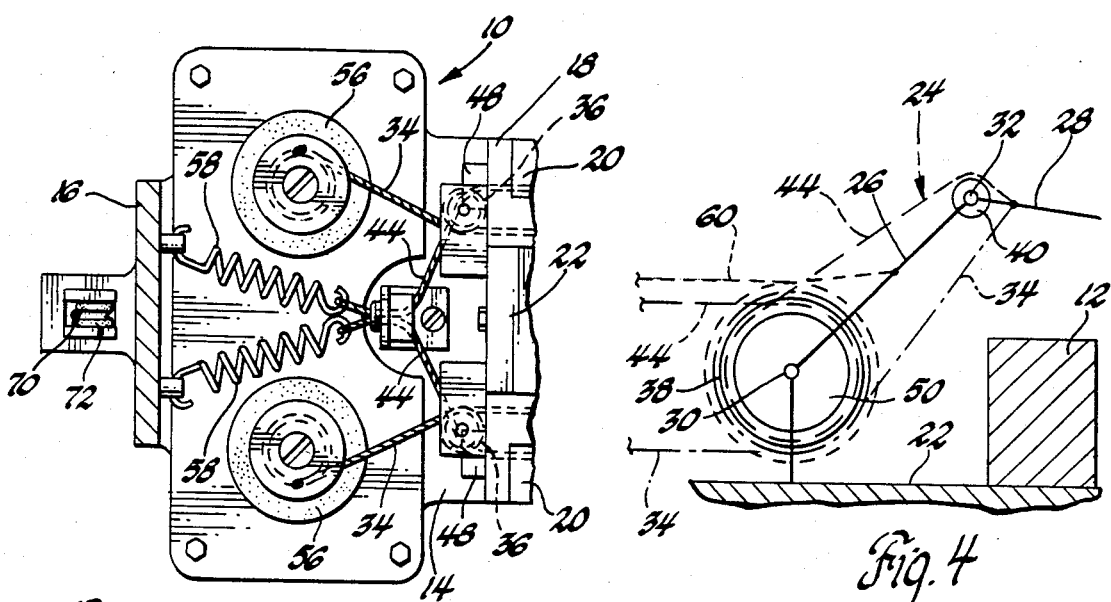
Fig. 3
Fig. 4
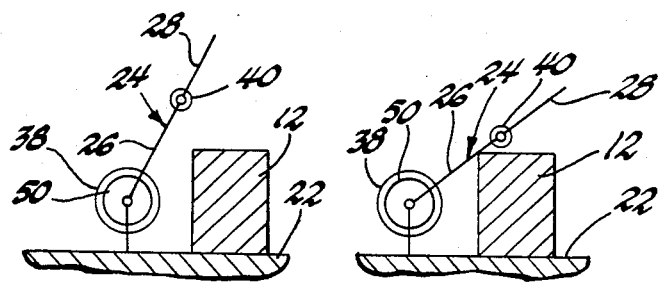
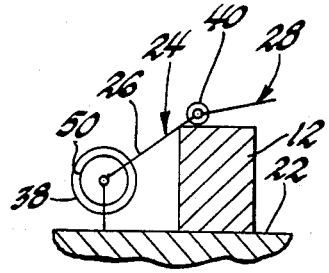
Fig. 5A
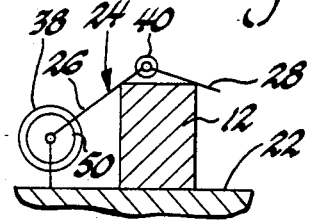
Fig. 5B
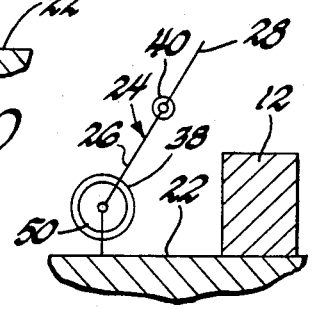
Fig. 5C
Fig. 5D
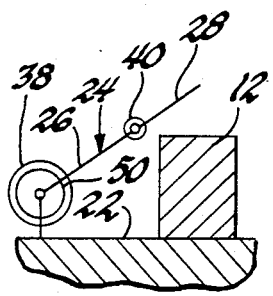
Fig. 6A
Fig. 6B
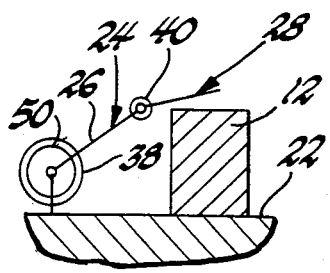
Fig. 6C
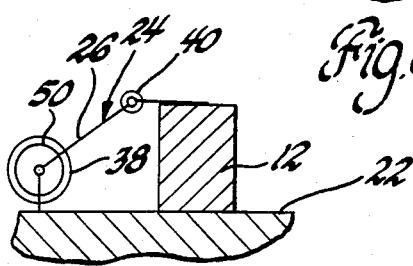
Fig. 6D

ROBOTIC MECHANICAL HAND

This application relates to mechanical gripping devices in general, and specifically to a robotic mechanical hand.

BACKGROUND OF THE INVENTION

Programmable assembly apparatuses, often known as robots, are generally controlled by a computer, and move in a pre-set pattern to accomplish whatever assembly task is required. Rapid advances in microprocessor technology and electronics have led to increasing sophistication in programmability, and greater flexibility and complexity in the tasks that robots can accomplish. However, a mechanical gripping device of some sort is still necessary at the interface between the robot and the object that is to be manipulated. A greater potential in programmability is useless without such a device that is capable of translating that potential into physical results.

Several different types of mechanical gripping devices are known. One relatively simple type uses a gripper that operates like a pair of tongs, with a pair of members that move together and apart. Such a gripping device is clearly limited in the types of tasks that it can perform, and does not have the flexibility to manipulate objects of widely varying size or shape. Another type uses a more complex gripper with a pair of articulated fingers, each including two or more serially pivoted elements, that can better conform to objects of varying size and shape. An example of this type is disclosed in the U.S. Pat. No. 4,350,381 to Hellmann, in which the articulated finger elements are powered by hydraulic means. Another type of gripper with an articulated finger has serially pivoted finger elements operated by a series of pulleys and cables. Pulling on one cable causes the finger to wrap or conform to an object, the finger elements acting in series, one after another. An antagonistically acting cable unwraps the finger elements in reverse order. An example of this type of gripping device is disclosed in *NASA Technical Briefs*, Fall 1983, page 99. A drawback of this type of device is that it operates in only a single mode, that is, all the finger elements wrap an object, and then all are unwrapped. The finger elements cannot be operated selectively. Such devices are also more complex and less compact than may be desirable in many manufacturing operations.

SUMMARY OF THE INVENTION

The subject invention overcomes the above noted shortcomings by providing a dual mode robotic mechanical hand for gripping and releasing objects in which the articulated finger elements may be selectively operated. The invention also provides such a dual mode robotic hand in a simple and compact three fingered embodiment.

The mechanical hand of the invention includes a compact frame having a horizontal platform and a vertical wall attached to and extending down from the back of the platform. A fixed finger extends horizontally out from the platform. A pair of identical articulated fingers are joined to the platform above and in opposed relation to the fixed finger. Each articulated finger includes a base digit pivoted to the platform and a tip digit that is pivoted to the base digit. Each of the articulated fingers is operable in a first mode by a gripping cable and an oppositely acting releasing cable. The gripping cables are adapted by a suitable pulley arrangement to move the articulated fingers into a gripping position so as to grip an object against the fixed finger. When operating in the first mode, the base digits initially pivot relative to the frame until they engage the object to be gripped, and then the tip digits pivot relative to the base digits until the tip digits also engage the object. The releasing cables are also adapted by a suitable pulley arrangement to move the articulated fingers into a release position by pivoting the tip and base digits oppositely to the gripping cables.

The gripping and releasing cables are, in turn, operated by a first controllable power means and a tensioning means respectively to so move the articulated fingers. The tensioning means includes a spring hooked between the frame and the releasing cables which acts to continually retract the releasing cables and thereby move the articulated fingers into the release position. The first controllable power means includes a DC servo motor, harmonic drive and optical encoder, one set for each gripping cable, all compactly mounted to the frame platform and controlled by computer. The first power means operates the gripping cables by retracting them to move the articulated fingers, in opposition to the tensioning means, into the gripping position. The gripping cables are then played out so that the tensioning means may retract the releasing cables and move the articulated fingers into the release position. The amount of retraction and playing out is monitored by the optical encoders, which information is fed into the computer controller.

Each of the articulated fingers is also operable in a second mode in which only the tip digits are moved. A braking cable is adapted, also by a suitable pulley arrangement, to anchor both of the base digits so that they cannot move relative to the frame. Once the base digits are so anchored, only the tip digits will pivot relative to the anchored base digits as the gripping cables are operated. This allows objects of a smaller size to be more easily manipulated. A second controllable power means, also a DC servo motor, harmonic drive, and optical encoder is mounted to the frame to operate the braking cable. The computer controller is programmed to operate the second power means to work in conjunction with the first power means when the articulated fingers are operating in the first mode. The second power means will track the first so that the braking cable is maintained without substantial slack or tension and will not interfere with first mode operation. However, when it is desired to operate in the second mode, the second power means will be ready to hold the braking cable fast to anchor both of the base digits relative to the frame. Most broadly, any number of articulated fingers operable in a dual mode may be used. However, the simplicity of the preferred three fingered embodiment is an advantage. While two different braking cables with independent second power means may also be used, the preferred embodiment, with the single second power means and braking cable, and with both the first and second power means mounted to the frame, is particularly compact.

It is, therefore, an object of the invention to provide a dual mode robotic mechanical hand for gripping and releasing objects, and to provide such a robotic hand in an embodiment that includes a frame and at least one articulated finger joined to the frame, an articulated finger that includes a base digit pivoted to the frame and a tip digit pivoted to the base digit, with the articulated finger being operable in a first mode by a gripping cable and an oppositely acting releasing cable, with the gripping cable being adapted to move the finger into a gripping position around an object by initially pivoting the base digit relative to the frame until the base digit engages the object and then pivoting the tip digit relative to the base digit until the tip digit engages the object, and with the releasing cable being adapted to move the finger into a release position by pivoting the tip and base digits oppositely to the gripping cable, and in which the release cable is operated by a tensioning means acting between the frame and the release cable to continually retract the releasing cable so as to move the finger into the release position, and in which the gripping cable is operated by a first controllable power means that retracts the gripping cable to move the finger in opposition to the tensioning means into the gripping position and that plays out the gripping cable so that the tensioning means may retract the releasing cable and move the finger into the release position, and which also includes a braking cable adapted to anchor the base digit relative to the frame so that the finger is operable in a second mode where the tip digit alone will pivot relative to the anchored base digit as the gripping cable is operated, with the braking cable being operated by a second controllable power means that works in conjunction with the first power means when the finger is operating in the first mode by tracking the first power means so that the braking cable is maintained without substantial slack or tension, with the second power means serving to hold the braking cable fast to thereby anchor the base digit relative to the frame when it is desired to operate the finger in the second mode.

It is another object of the invention to provide a dual mode mechanical hand of the type described in a three fingered embodiment that has a fixed finger extending from the frame and a pair of such articulated fingers joined to the frame and opposed to the fixed finger, with the articulated fingers each being operated by a gripping, a releasing, and a braking cable and operating in each mode to grip objects against the fixed finger.

It is yet another object of the invention to provide a three fingered dual mode mechanical hand of the type described in a particularly compact embodiment, one in which the first and second power means are mounted to the frame, and in which a single braking cable serves to anchor both articulated fingers.

BACKGROUND OF THE INVENTION

These and other objects and features of the invention will appear from the following written description and drawings in which:

FIG. 3 is a view of a portion of the preferred embodiment from the perspective of line 3—3 of FIG. 1;

FIG. 4 is a diagrammatic view of one of the articulated fingers;

FIGS. 5A and 5B are diagrammatic views of one of the articulated fingers moving in the first mode from a release position to the start of the gripping position;

FIGS. 5C and 5D are diagrammatic views of one of the articulated fingers operating in the first mode and moving into the gripping position;

FIGS. 6A and 6B are diagrammatic views of one of the articulated fingers being moved to a position where it will be operated in the second mode; FIGS. 6C and 6D are diagrammatic views of one of the articulated fingers being operated in the second mode.

Figures 1, 2:
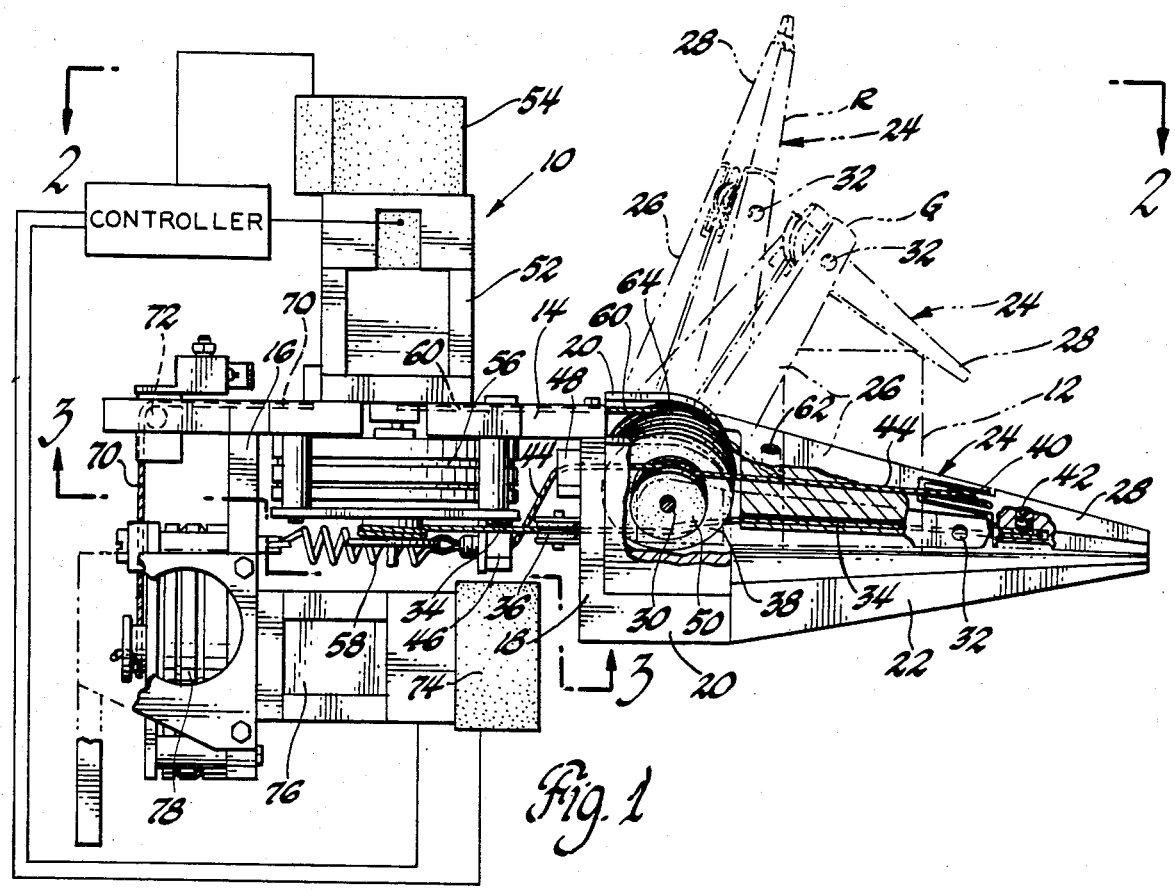
FIG. 1 is a side view of the preferred embodiment of the invention showing part of the articulated fingers broken away to reveal structural detail and showing a gripping and release position of one of the articulated fingers relative to an object in dotted lines.
FIG. 2 is a top plan view from the perspective of line 2—2 of FIG. 1.

Referring first to FIGS. 1-3, the structure of the invention will be described, after which the operation will be described with reference to the diagrammatic figures. The preferred embodiment of the invention, designated generally at 10, is a compact, three fingered, dual mode robotic mechanical hand. The mechanical hand 10 grips and releases objects, such as the object 12 shown in dotted lines in FIG. 1. The mechanical hand 10 includes a compact frame having a generally horizontal platform 14 and a vertical wall 16 extending down from the back of the platform 14. A generally V-shaped mounting member, designated generally at 18, is rigidly joined to the front of and beneath platform 14 and provides a pair of identical clevises 20, best visible in FIG. 2. A fixed, tapered finger 22 integral with mounting member 18 extends horizontally out from and beneath platform 14. Fixed finger 22 will serve in later description as a reference point relative to which the movable structural parts of the mechanical hand 10 may be described.

Still referring to FIGS. 1-3, a pair of identical articulated fingers, designated generally at 24, are shown in an inoperative stored position in solid lines. Each finger 24 includes a base digit 26 and a tip digit 28. Each base digit 26 is pivoted by a pin 30 to the outside of a clevis 20, and can rotate relative to the platform 14 approximately 90°. Each tip digit 28 is pivoted about a pin 32 to its respective base digit 26, and may pivot approximately 90° relative thereto. Each of the articulated fingers 24 is opposed to the fixed finger 22, and is independently operable in a first mode, more fully described below, by a suitable cable and pulley mechanism. The cable and pulley mechanism includes a gripping cable 34, one for each articulated finger 24, best seen in FIG. 1 and 3. Each gripping cable 34 runs from beneath platform 14 past a small anti-friction pulley 36 and through a passage in mounting member 18. From there, each gripping cable 34 is wrapped one turn around a central pulley 38 that turns freely on pin 30, and then runs through the length of base digit 26. After it exits base digit 26, each gripping cable 34 runs by a smaller pulley 40 that turns freely on pin 32 and is rigidly fastened at its end by a set screw 42 to tip digit 28. The cable and pulley mechanism also includes a releasing cable 44, one for each articulated finger 24. Each releasing cable 44 runs from beneath platform 14 through a pair of guiding eyelets 46 and 48 and makes one turn around a smaller, outboard pulley 50 that turns freely on pin 30. From there, each releasing cable 44 runs along the top of base digit 26, over pulley 40 and is also rigidly attached at its end to tip digit 28 by the set screw 42. The relative ratios of base and tip digits 26 and 28 and of pulleys 38, 40 and 50 are illustrated diagrammatically in FIG. 4. These relative ratios would be determined by formulae known to those skilled in the art. The gripping and releasing cables 34 and 44 are operated by a means described next.

Still referring to FIGS. 1-3, each gripping cable 34 is independently operated by a first power means that includes a DC servo motor 52 mounted at the top of platform 14, an optical encoder 54 mounted to the top of motor 52, and a harmonic drive 56 mounted below platform 14. Harmonic drive 56 is turned by motor 52, which has a maximum torque of 12.9 ounce inches at 4,370 RPM. Harmonic drive 56 is of the pancake type and has a drive ratio of 110 to 1, which serves to significantly gear down the speed, but increase the power of motor 52. Each gripping cable 34 is retracted or played out from a harmonic drive 56. The operation of motor 52 is monitored by the optical encoder 54, and both motor 52 and encoder 54 are electronically connected to the computer controller, which is indicated generally by a box. More of the computer controller operation will be described below. Each releasing cable 44 is operated automatically by a tensioning means that includes a tension spring 58 hooked between vertical wall 16 and releasing cable 44. Each spring 58 pulls continually and antagonistically to a gripping cable 34. The operation of each articulated finger 24 in the first mode will be next described.

Referring next to FIGS. 1, 3 and 5A through 5D, an articulated finger 24 begins in a release position, which is shown in dotted lines at R in FIG. 1 and is shown diagrammatically in FIG. 5A. Finger 24 would be moved initially to the release position from the solid line stored position, by playing out gripping cable 34 so as to allow the releasing cable 44 to pull finger 24 straight up. In the release position, tip digit 28 is essentially colinear with base digit 26. When a motor 52 begins to turn a harmonic drive 56 clockwise from the perspective of FIG. 3, a gripping cable 34 is retracted. This causes an articulated finger 24 to rotate straight down about its base digit 26, until the base digit 26 contacts an object to manipulated, as may be seen in the sequence of FIG. 5A to 5B. The spring 58 is stretched during this motion of articulated finger 24. When the base digit 26 contacts the object, pressing it against the fixed finger 22, the base digit 26 stops rotating, and the tip digit 28 begins to rotate relative to the base digit 26. This is shown in FIG. 5C. When tip digit 28 also contacts the object, it too stops rotating. The gripping force is removed by turning the motor 52 in the other direction to play out the gripping cable 34. The articulated finger 24 then moves automatically back to its release position. The rotation of the base and tip digits 26 and 28 would be reversed as finger 24 moves back to the release position.

The just described first mode of gripping an object is known in the art as "soft gripping". The computer controller can be programmed to stop the retraction of gripping cable 34 at any point by stopping motor 52. Several different methods may be used to control motor 52 with the computer. One method is position control, in which a the number of revolutions of motor 52 back and forth is set and determined for each object so as to put the desired tension in the gripping cables 34. The optical encoder 54 monitors the operation of motor 52 in a manner well known to those skilled in the art. For the particular embodiment disclosed, a gripping force of up to 20 pounds is possible. It will be understood that both articulated fingers 24 would most often be moved together to grip an object against the fixed finger 22, and would move equal amounts for a symmetrical object. However, each finger 24 could be programmed, since it is independently operated, to flex different amounts. The subject invention also has the additional capability of a second mode of operation, provided by structure described next.

Referring again to FIGS. 1 and 2, a braking cable designated generally at 60 is rigidly attached at its two ends by set screws 62 to the bottom of each base digit 26. Each side of braking cable 60 makes one turn around an inboard pulley 64 freely pivoted onto the pin 30. Each side of the braking cable 60 is then routed through a pulley assembly designated generally at 66, which serves to route the two sides of the braking cable 60 inwardly toward one another. Finally, the center of braking cable 60 is attached to a central yoke and pulley assembly 68, which is in turn attached to a central end cable 70, which is effectively a continuation of braking cable 60. End cable 70 is then routed 90° around a small anti-friction pulley 72. Braking cable 60 is operated by a second controllable power means, which also includes an optical encoder 74, a DC servo motor 76 mounted to vertical wall 16, and a harmonic drive 78, all identical to the first controllable power means described above. The end cable 70 is attached to harmonic drive 78 and is retracted and played out in similar fashion to the gripping cables 34.

When the mechanical hand 10 is operating in the first mode, the computer controller is programmed to operate the second power means in conjunction with the first. That is, the second power means will track the first, alternately retracting and playing out the end cable 70 so that the braking cable 60 is maintained without a substantial tension or slack. However, the computer controller may be programmed to hold the harmonic drive 78 fast, thereby holding the braking cable 60 fast and anchoring both of the base digits 26 relative to the platform 14. The mechanical hand 10 may then be operated in the second mode. Retraction of the gripping cables 34 will then cause only the tip digits 28 to rotate relative to the base digits. Thus, referring to FIGS. 6A and 6B, an articulated finger 24 may move down from the position of 6A to 6B, and the braking cable 60 then held fast. Thereupon, retraction of the gripping cables 34 will cause only the tip digits 28 to rotate downwardly until they engage an object and stop, as shown in FIGS. 6C through 6D. This conveniently allows objects of a smaller size to be manipulated.

The preferred three fingered embodiment with the one fixed finger is particularly compact and simple, as compared to three or more articulated fingers. It will be understood, however, that any number of articulated fingers operating in the dual mode disclosed could be used. It should also be noted that two separate braking cables and two separate second controllable power means could be used. However, the preferred embodiment shown is more compact by virtue of the single braking cable. The second controllable power means provided by optical encoder 74, motor 76, and harmonic drive 78 is mounted conveniently below platform 14, compactly occupying the space between vertical wall 16 and fixed finger 22. Also, spring 58 conveniently occupies the space between motor 76 and harmonic drive 56. This is an advantageous use of available space, as compared to more complex mechanical hands with larger drive means located separate from the frame to which the fingers are mounted. The three fingered embodiment disclosed could also, if desired, be used with articulated fingers operable only in the first mode, which would still provide the advantages of simplicity and compactness. Therefore, it will be understood that the invention is capable of being embodied in structures other than that disclosed, and is not intended to be so limited.

The embodiments of the invention in which an exclusive property or privilege is claimed are defined as follows:

1. A dual mode robotic mechanical hand for gripping and releasing objects, comprising;

a frame, an articulated finger joined to said frame including a base digit pivoted to said frame and a tip digit pivoted to said base digit, said articulated finger being operable in a first mode by a gripping cable and an oppositely acting releasing cable, said gripping cable being adapted to move said finger into a gripping position around an object by initially pivoting said base digit relative to said frame until said base digit engages said object and then pivoting said tip digit pivot relative to said base digit until said tip digit engages said object, said releasing cable being adapted to move said finger into a release position by pivoting said tip and base digits oppositely to said gripping cable, tensioning means acting between said frame and said release cable to continually retract said releasing cable so as to move said articulated finger into said release position, a first controllable power means to operate said gripping cable by retracting said gripping cable to move said finger in opposition to said tensioning means into said gripping position and by playing out said gripping cable so that said tensioning means may retract said releasing cable and move said articulated finger into said release position, a braking cable adapted to anchor said base digit relative to said frame so that said articulated finger is operable in a second mode where said tip digit alone will pivot relative to said anchored base digit as said gripping cable is operated, and, a second controllable power means to operate said braking cable, said second power means working in conjunction with said first power means when said finger is operating in said first mode by tracking said first power means so that said braking cable is maintained without substantial slack or tension, said second power means serving to hold said braking cable fast to thereby anchor said base digit relative to said frame when it is desired to operate said articulated finger in said second mode.

2. A three fingered, dual mode robotic mechanical hand for gripping and releasing objects, comprising;

a frame, a fixed finger extending from said frame, a pair of articulated fingers joined to said frame and opposed to said fixed finger, each articulated finger including a base digit pivoted to said frame and a tip digit pivoted to said base digit, each of said articulated fingers being operable in a first mode by a gripping cable and an oppositely acting releasing cable, said gripping cables being adapted to move each of said articulated fingers into a gripping position so as to grip an object in cooperation with the other articulated finger against said fixed finger by initially pivoting said base digits relative to said frame until said base digits engage said object and then pivoting said tip digits pivot relative to said base digits until said tip digits engage said object, said releasing cables being adapted to move each of said articulated fingers into a release position by pivoting said tip and base digits oppositely to said gripping cables, tensioning means acting between said frame and said releasing cables to continually retract said releasing cables so as to move said articulated fingers into said release position, a first controllable power means to operate said gripping cables by retracting said gripping cables to move said articulated fingers in opposition to said tensioning means into said gripping position and by playing out said gripping cables so that said tensioning means may retract said releasing cable and move said articulated fingers into said release position, a braking cable adapted to anchor each of said base digits relative to said frame so that said articulated fingers are operable in a second mode where said tip digits alone will pivot relative to said base digits as said gripping cables are operated, and, a second controllable power means to operate said braking cables, said second power means working in conjunction with said first power means when said articulated fingers are operating in said first mode by tracking said first power means so that said braking cables are maintained without substantial slack or tension, said second power means serving to hold said braking cables fast to thereby anchor said base digits relative to said frame when it is desired to operate said articulated fingers in said second mode.

3. A compact, dual mode robotic mechanical hand for gripping and releasing objects, comprising;

a frame, a fixed finger extending from said frame, a pair of articulated fingers joined to said frame and opposed to said fixed finger, each articulated finger including a base digit pivoted to said frame and a tip digit pivoted to said base digit, each of said articulated fingers being operable in a first mode by a gripping cable and an oppositely acting releasing cable, said gripping cables being adapted to move each of said articulated fingers into a gripping position so as to grip an object in cooperation with the other articulated finger against said fixed finger by initially pivoting said base digits relative to said frame until said base digits engage said object and then pivoting said tip digits pivot relative to said base digits until said tip digits engage said object, said releasing cables being adapted to move each of said articulated fingers into a release position by pivoting said tip and base digits oppositely to said gripping cables, tensioning means acting between said frame and said releasing cables to continually retract said releasing cables so as to move said articulated fingers into said release position, a first controllable power means mounted to said frame to operate said gripping cables by retracting said gripping cables to move said articulated fingers in opposition to said tensioning means into said gripping position and by playing out said gripping cables so that said tensioning means may retract said releasing cable and move said articulated fingers into said release position, a braking cable adapted to anchor both of said base digits relative to said frame so that said articulated fingers are operable in a second mode where said tip digits alone will pivot relative to said anchored base digits as said gripping cables are operated, and, a second controllable power means mounted to said frame to operate said braking cable, said second power means working in conjunction with said first power means when said articulated fingers are operating in said first mode by tracking said first power means so that said braking cable is maintained without substantial slack or tension, said second power means serving to hold said braking cable fast to thereby anchor both of said base digits relative to said frame when it is desired to operate said articulated fingers in said second mode.

* * * * *